US011480068B2

(12) United States Patent
Trivedi et al.

(10) Patent No.: US 11,480,068 B2
(45) Date of Patent: Oct. 25, 2022

(54) SYSTEMS AND METHOD OF SERVICING A TURBOMACHINE

(71) Applicant: General Electric Company, Schenectady, NY (US)

(72) Inventors: Deepak Trivedi, Halfmoon, NY (US); Don Mark Lipkin, Niskayuna, NY (US); Rebinth Jose Robin, Bengaluru (IN); Shivakumar Basavanna, Bengaluru (IN); Andrew Crispin Graham, Badminton (GB)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/653,424

(22) Filed: Oct. 15, 2019

(65) Prior Publication Data

US 2021/0108536 A1  Apr. 15, 2021

(51) Int. Cl.
*F01D 25/00* (2006.01)
*B23P 6/00* (2006.01)
*G02B 23/24* (2006.01)
*G01M 15/14* (2006.01)

(52) U.S. Cl.
CPC .............. *F01D 25/00* (2013.01); *B23P 6/002* (2013.01); *G01M 15/14* (2013.01); *G02B 23/2484* (2013.01); *F05D 2230/72* (2013.01)

(58) Field of Classification Search
CPC ........ B23P 6/002; F01D 25/00; F01D 21/003; F01D 25/285; F01D 5/005; F01D 2230/72; F05D 2270/8041; G01M 15/14; G02B 23/2484
USPC ........................................... 356/241.1–241.6
See application file for complete search history.

(56) References Cited

U.S. PATENT DOCUMENTS

| 3,841,764 | A | 10/1974 | Snell et al. |
| 4,298,312 | A | 11/1981 | MacKenzie et al. |
| 4,659,195 | A | 4/1987 | D'Amelio et al. |
| 5,155,941 | A | 10/1992 | Takahashi et al. |

(Continued)

FOREIGN PATENT DOCUMENTS

| DE | 10052679 | 5/2001 |
| EP | 1811136 | 7/2007 |

(Continued)

OTHER PUBLICATIONS

Burgner-Kahrs et al., "Continuum Robots for Medical Applications: A Survey", IEEE Robotics and Automation Society, vol. 31, Issue: 06, pp. 1261-1280, Dec. 2015.

(Continued)

*Primary Examiner* — Tri T Ton
(74) *Attorney, Agent, or Firm* — Fitch, Even, Tabin & Flannery LLP

(57) ABSTRACT

A system for use in servicing a turbomachine, the system including a first tubular body including an interior channel, and a second tubular body. The first and second tubular bodies are bendable between a neutral shape and a biased shape. The bodies are bent when in the neutral shape. The second tubular body includes a tip end, and the second tubular body is translatable within the interior channel. The first tubular body and the second tubular body are rotatable to selectively orient the tip end in multiple degrees of freedom. The system also includes a steering cable extending from the tip end, wherein the steering cable biases the tip end for selective orientation in additional degrees of freedom.

20 Claims, 7 Drawing Sheets

(56) References Cited

U.S. PATENT DOCUMENTS

| | | |
|---|---|---|
| 6,749,560 B1 | 6/2004 | Konstorum et al. |
| 6,943,570 B2 | 9/2005 | Duffy |
| 7,371,210 B2 | 5/2008 | Brock |
| 7,721,435 B2 | 5/2010 | Stokes |
| 7,854,738 B2 | 12/2010 | Lee et al. |
| 8,400,501 B2 | 3/2013 | Heyworth |
| 8,425,408 B2 | 4/2013 | Boulais et al. |
| 8,535,336 B2 | 9/2013 | Trovato |
| 8,715,226 B2 | 5/2014 | Webster et al. |
| 9,011,318 B2 | 4/2015 | Choset et al. |
| 9,282,993 B1 | 3/2016 | Cohen et al. |
| 9,333,650 B2 | 5/2016 | Bajo et al. |
| 9,492,234 B2 | 11/2016 | Comber et al. |
| 9,539,726 B2 | 1/2017 | Simaan et al. |
| 9,895,163 B2 | 2/2018 | Trovato et al. |
| 9,946,979 B2 | 4/2018 | Trovato et al. |
| 2005/0090809 A1 | 4/2005 | Cooper et al. |
| 2008/0064921 A1 | 3/2008 | Larkin et al. |
| 2011/0015490 A1 | 1/2011 | Trovato et al. |
| 2011/0201887 A1 | 8/2011 | Greenblatt et al. |
| 2011/0245625 A1 | 10/2011 | Trovato et al. |
| 2011/0251455 A1 | 10/2011 | Popovic |
| 2011/0270040 A1 | 11/2011 | Popovic et al. |
| 2011/0295199 A1 | 12/2011 | Popovic et al. |
| 2012/0029288 A1 | 2/2012 | Greenblatt et al. |
| 2012/0312103 A1 | 12/2012 | Hannott et al. |
| 2013/0199040 A1 | 8/2013 | Dudeck et al. |
| 2015/0080907 A1 | 3/2015 | Herrell et al. |
| 2015/0088161 A1 | 3/2015 | Hata et al. |
| 2015/0223832 A1 | 8/2015 | Swaney et al. |
| 2016/0016319 A1 | 1/2016 | Remirez et al. |
| 2016/0030124 A1 | 2/2016 | Kishi |
| 2016/0296267 A1 | 10/2016 | Neimat et al. |
| 2016/0346513 A1 | 12/2016 | Swaney et al. |
| 2017/0095299 A1 | 4/2017 | Hendrick et al. |
| 2017/0143436 A1 | 5/2017 | Lathrop et al. |
| 2017/0312920 A1 | 11/2017 | Yipe et al. |
| 2018/0232951 A1 | 8/2018 | Alterovitz et al. |

FOREIGN PATENT DOCUMENTS

| | | |
|---|---|---|
| EP | 2623731 | 8/2013 |
| FR | 2186213 A1 | 1/1974 |
| WO | 2011057031 | 5/2011 |
| WO | 2011058008 | 5/2011 |
| WO | 2013026012 A1 | 2/2013 |
| WO | 2017120516 A1 | 7/2017 |

OTHER PUBLICATIONS

Vasilyev et al., "Tissue Removal Inside the Beating Heart Using a Robotically Delivered Metal MEMS Tool", International Journal of Robotics Research, pp. 1-13, Sep. 4, 2014.

US 11,480,068 B2

SYSTEMS AND METHOD OF SERVICING A TURBOMACHINE

BACKGROUND

The field of the disclosure relates generally to turbomachine maintenance and, more particularly, to systems and a method for use in performing maintenance within a confined space of a turbomachine.

At least some known turbine engines include an outer case and at least one rotor that includes multiple stages of rotating airfoils, i.e., blades, which rotate with respect to the outer case. In addition, the outer case includes multiple stages of stationary airfoils, i.e., guide vanes. The blades and guide vanes are arranged in alternating stages. In at least some known rotary machines, shrouds are disposed on the radially inner surfaces of a stator to form a ring seal around tips of the blades. Together, the blades, guide vanes, and shrouds define a primary flowpath inside the compressor and turbine sections of the rotary machine. This flowpath, combined with a flowpath through the combustor, defines a primary cavity within the turbine engine.

During operation, the components of the turbine engine experience at least some material degradation as a function of the components' service history. Accordingly, for at least some known turbine engines, periodic inspections, such as borescope inspections, are performed to assess the condition of the turbine engine between service intervals. However, it may be difficult to inspect certain regions within the turbine engine with conventional borescope inspection techniques. As an alternative to conducting borescope inspections, at least some known turbine engines are at least partially disassembled from an airframe and moved to a facility to allow repair and/or replacement of damaged components at regularly scheduled service intervals. For example, damaged components the turbine engines are primarily repaired at overhaul or component repair facilities that are offsite from a location of the airframe. However, disassembling turbine engines for regular service and inspection is a costly and time-consuming endeavor.

BRIEF DESCRIPTION

In one aspect, a system for use in servicing a turbomachine is provided. The system includes a first tubular body including an interior channel. The first tubular body is bendable between a neutral shape or a biased shape, with the first tubular body being bent when in the neutral shape. A second tubular body includes a tip end, wherein the second tubular body is translatable within the interior channel. The second tubular body is bendable between a neutral shape and a biased shape, with the second tubular body being bent when in the neutral shape. The first tubular body and the second tubular body are rotatable to selectively orient the tip end in multiple degrees of freedom. The system also includes a steering cable extending from the tip end, wherein the steering cable is configured to bias the tip end for selective orientation in additional degrees of freedom.

In another aspect, a system for use in servicing a turbomachine is provided. The system includes a guide tube including an interior, and a tubular assembly sized for insertion within, and deployable from, the interior of the guide tube. The tubular assembly includes a first tubular body including an interior channel, and the first tubular body is bendable between a neutral shape or a biased shape, with the first tubular body being bent when in the neutral shape. A second tubular body of the tubular assembly includes a tip end. The second tubular body is translatable within the interior channel, and is bendable between a neutral shape and a biased shape, with the second tubular body being bent when in the neutral shape. The first tubular body and the second tubular body are rotatable to selectively orient the tip end in multiple degrees of freedom. The system also includes a steering cable extending from the tip end, wherein the steering cable is configured to bias the tip end for selective orientation in additional degrees of freedom, and a payload coupled to the tip end.

In yet another aspect, a method of servicing a turbomachine is provided. The method includes disassembling the turbomachine to provide access to a confined space within the turbomachine, wherein the confined space includes a maintenance location. The method also includes positioning a tubular assembly within the confined space, the tubular assembly including a first tubular body having an interior channel, and the first tubular body being bent when in a neutral shape. A second tubular body of the tubular assembly has a tip end, wherein the second tubular body is translatable within the interior channel, and the second tubular body being bent when in a neutral shape. A payload is coupled to the tip end. The method also includes rotating at least one of the first tubular body and the second tubular body to selectively orient the tip end in multiple degrees of freedom to position the payload proximate the maintenance location, biasing, with a steering cable, the tip end for selective orientation in additional degrees of freedom to position the payload proximate the maintenance location, and performing an operation at the maintenance location with the payload.

DRAWINGS

These and other features, aspects, and advantages of the present disclosure will become better understood when the following detailed description is read with reference to the accompanying drawings in which like characters represent like parts throughout the drawings, wherein.

Figure 1:
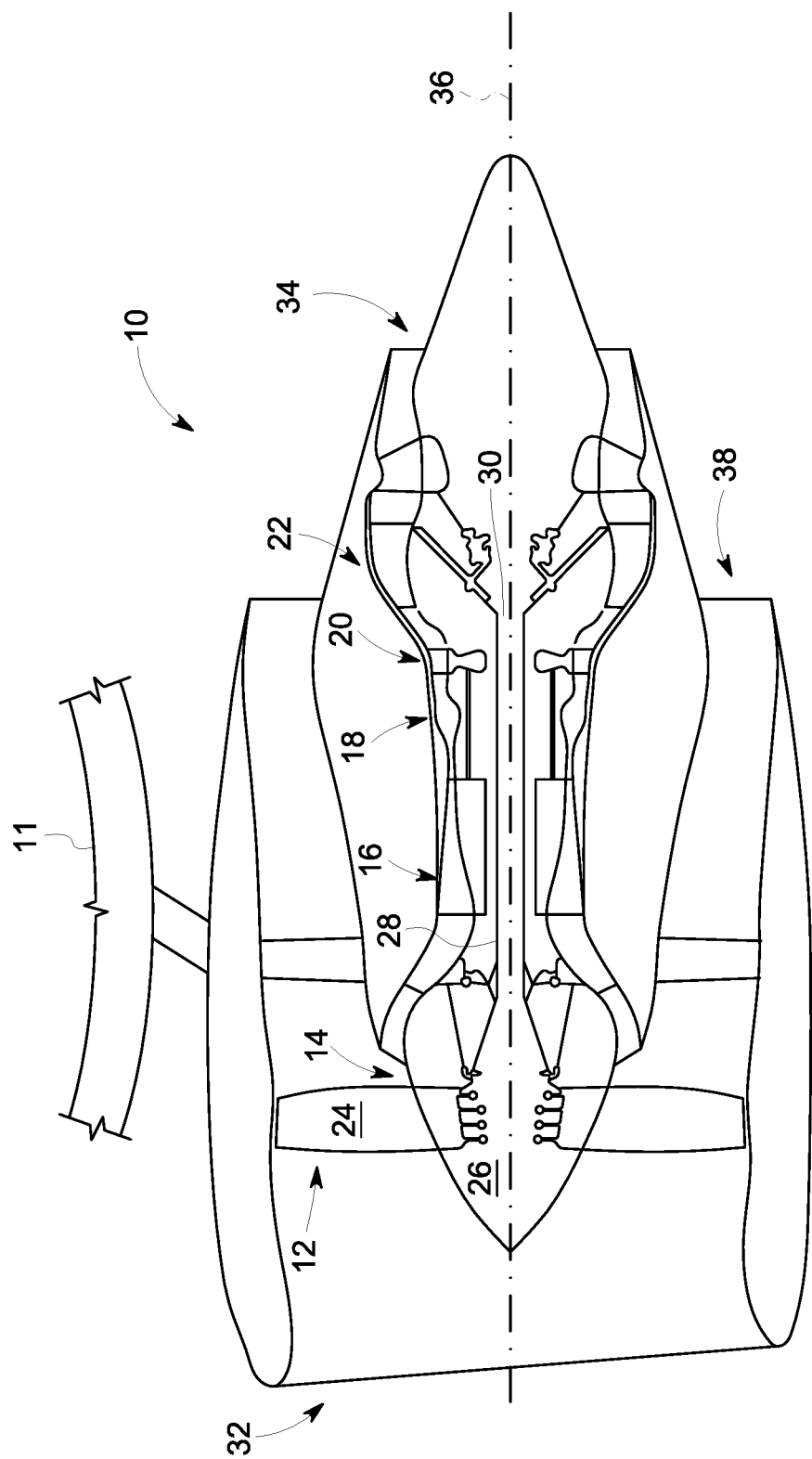
FIG. 1 is a schematic illustration of an exemplary turbomachine.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to systems and a method for use in performing maintenance within a confined space of a turbomachine, such as a turbine engine. In the exemplary embodiment, the systems described herein include a tubular assembly including a first tubular body and a second tubular body. The second tubular body is sized for insertion within the first tubular body. The first tubular body is rotatable relative to its longitudinal axis when positioned within the confined space, and the second tubular body is rotatable and translatable relative to the first tubular body. In addition, the first and second tubular bodies are each bendable between a neutral shape and a biased shape. The bodies are bent when in the neutral shape, such that a tip end of the second tubular body is selectively orientable in multiple degrees of freedom by rotating one or both of the first and second tubular bodies. A steering cable extending from the tip end may also be used to bias the tip end for selective orientation in additional degrees of freedom. A payload may be coupled to the tip end. As such, the tubular assembly enables the payload to be maneuvered around obstacles within the turbine engine for positioning the payload proximate a maintenance location. The payload may then perform an operation at the maintenance location such as, but not limited to, an inspection operation. As such, the systems and method described herein enable in-situ inspection of turbine engine components that are positioned in confined or hard-to-reach locations.

FIG. 1 is a schematic diagram of an exemplary turbine engine 10 coupled to an airframe 11. Turbine engine 10 includes a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an inlet 32 and a core exhaust 34. Turbine engine 10 further includes a centerline 36 about which fan assembly 12, booster compressor assembly 14, high-pressure compressor assembly 16, and turbine assemblies 20 and 22 rotate.

In operation, some of the air entering turbine engine 10 through inlet 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled through turbine assemblies 20 and 22. Combustion gas is subsequently discharged from turbine engine 10 via core exhaust 34 and a fan exhaust 38.

Figure 2:
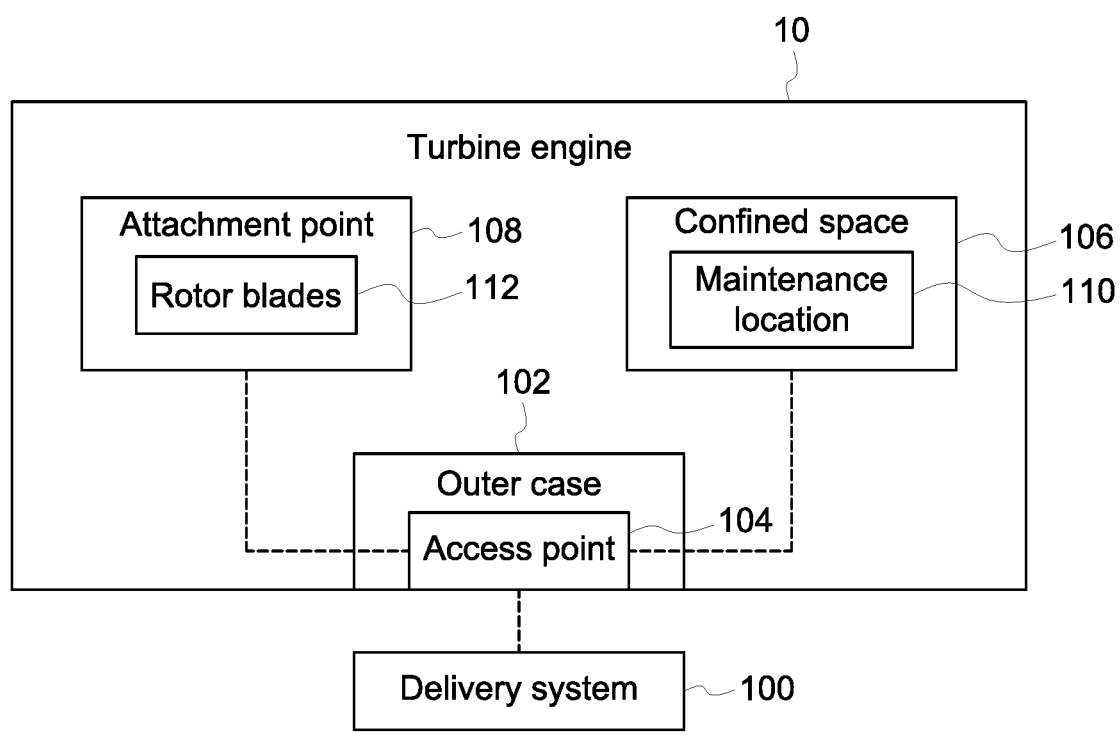
FIG. 2 is a box diagram illustrating an exemplary turbomachine and system that may be used to deliver a payload within the turbomachine.

FIG. 2 is a box diagram illustrating an exemplary turbine engine 10 and system 100 that may be used to deliver a payload within turbine engine 10. In the exemplary embodiment, turbine engine 10 further includes an outer case 102 having an access point 104 defined therein. For example, turbine engine 10 may be at least partially disassembled while coupled to airframe 11 (shown in FIG. 1) to define access point 104. Example access points may include, but are not limited to, borescope ports, ignitor ports, and the like. Access point 104 provides access to a confined space 106 and to an attachment point 108 within turbine engine 10. Confined space 106 is defined by components of turbine engine 10, as will be described in more detail below, and includes a maintenance location 110 in which an operation is to be performed.

System 100 is positionable within confined space 106 to facilitate performing the maintenance operation at maintenance location 110. For example, system 100 may be routed from exterior of outer case 102, through access point 104, and through turbine engine 10 to be positioned within confined space 106. In some embodiments, system 100 is coupleable to attachment point 108 to facilitate positioning and stabilizing system 100 within turbine engine 10, and for enabling performance of the operation by system 100 within confined space 106. In the exemplary embodiment, attachment point 108 is defined by blades 112 within turbine engine 10. As will be described in more detail below, system 100 couples to attachment point 108 by being mounted directly to one of blades 112, or by wedging itself between adjacent blades 112, for example.

Figure 3:
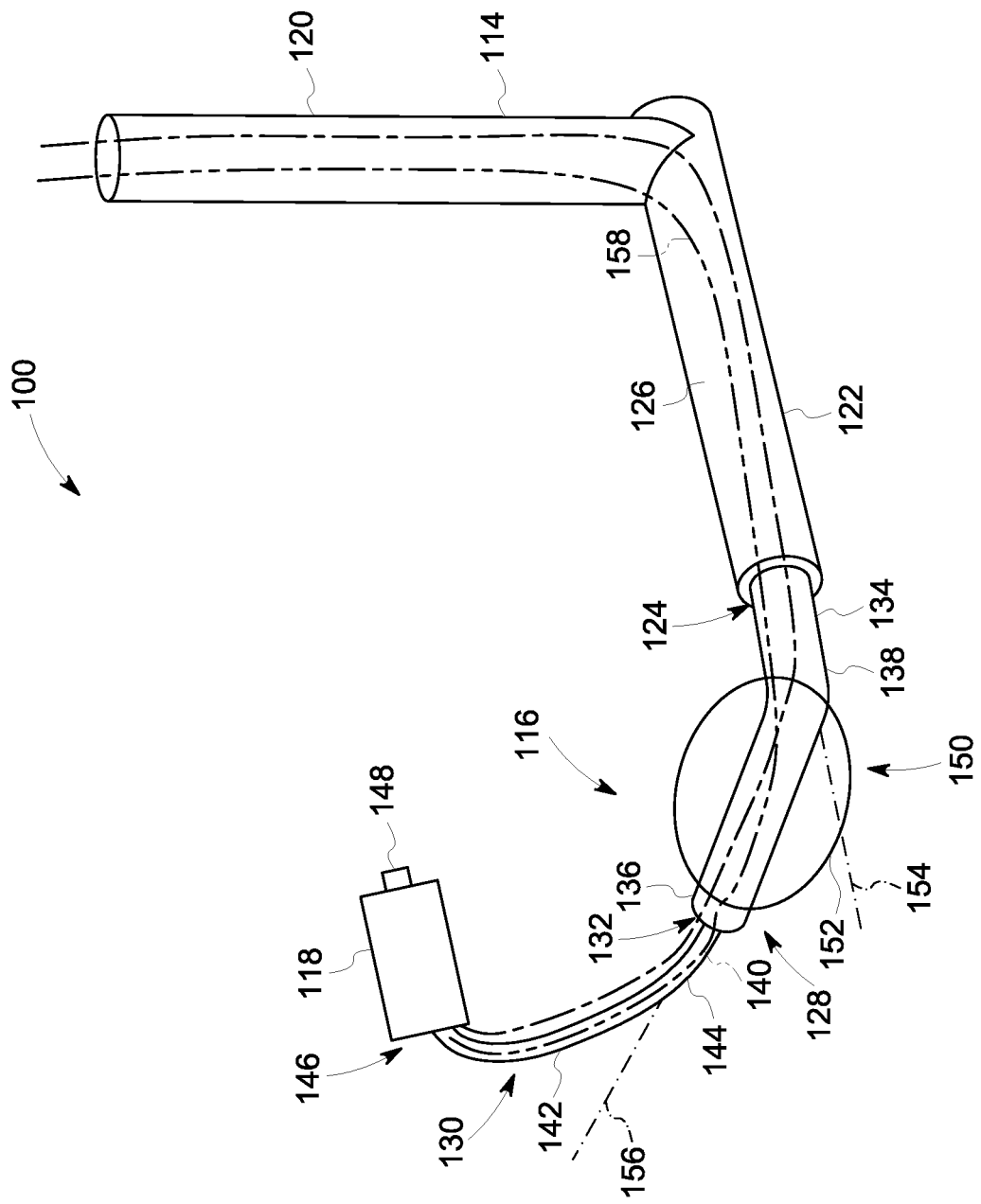
FIG. 3 is a perspective illustration of the system shown in FIG. 2.

FIG. 3 is a perspective illustration of system 100. In the exemplary embodiment, system 100 includes a guide tube 114, a tubular assembly 116, and a payload 118 coupled to tubular assembly 116. Guide tube 114 has a first portion 120, a second portion 122 having an open end 124, and an interior 126 extending through first portion 120 and second portion 122. First portion 120 and second portion 122 are oriented obliquely or perpendicularly relative to each other to enable guide tube 114 to be selectively oriented in multiple directions when being routed through turbine engine 10. Tubular assembly 116 is sized for insertion within, for deployment from, interior 126 of guide tube 114. For example, as shown in FIG. 3, tubular assembly 116 is deployed from guide tube 114 for extension from open end 124.

Alternatively, tubular assembly 116 is partially or fully retractable within interior 126 of guide tube 114. As noted above, system 100, and more specifically tubular assembly 116, is positionable within confined space 106 (shown in FIG. 2) to facilitate positioning payload 118 proximate maintenance location 110 (shown in FIG. 2). In operation, tubular assembly 116 is routed through turbine engine 10 towards confined space 106 while at least partially retracted within guide tube 114. As such, tubular assembly 116 is routable through turbine engine 10 in a controlled and predictable manner. For example, guide tube 114 is a rigid structure having a predetermined shape, whereas tubular assembly 116 has a naturally bent shape when deployed from guide tube 114. In addition, in one embodiment, guide tube 114 has a diameter of less than about 1 inch, which enables guide tube 114 to be routable through tight spaces within turbine engine 10.

Tubular assembly 116 includes a first tubular body 128 and a second tubular body 130. First tubular body 128 has an interior channel 132, and second tubular body 130 is translatable and rotatable within interior channel 132. First tubular body 128 and second tubular body 130 are fabricated from a flexible material such as, but not limited to, a superelastic material such as nitinol, or a polymeric material. As such, first tubular body 128 and second tubular body 130 are bendable between a neutral shape and a biased shape. The biased shape is formed when a biasing force is applied to first tubular body 128 and/or second tubular body 130, and the neutral shape is formed when the biasing force is removed therefrom. In one embodiment, the biasing force is applied by second portion 122 of guide tube 114 when first tubular body 128 and second tubular body 130 are retracted therein. The neutral shape is formed when first tubular body 128 is deployed from guide tube 114 by a predetermined distance, and when second tubular body 130 is deployed from first tubular body 128 by a predetermined distance. For example, first tubular body 128 includes a first section 134, a second section 136, and a first bend 138 defined therebetween such that first section 134 and second section 136 are oriented obliquely or perpendicularly relative to each other when in the neutral shape. Second tubular body 130 includes a first section 140, a second section 142, and a second bend 144 defined therebetween such that first section 140 and second section 142 are oriented obliquely or perpendicularly relative to each other when in the neutral shape.

Second tubular body 130 includes a tip end 146, and payload 118 is coupled to tip end 146. Payload 118 is any device, mechanism, or object that enables system 100 to maintain turbine engine 10, such as at maintenance location 110. Example payloads include, but are not limited to, a sensor, such as an eddy current sensor, a repair tool, a dispense tool (e.g., a spray or paste dispenser), and the like. In the exemplary embodiment, system 100 also includes a camera 148 coupled to tip end 146. Camera 148 is operable to provide real-time visual feedback to an operator, for example, to facilitate routing tubular assembly system 100 through turbine engine 10, and to facilitate positioning payload 118 proximate maintenance location 110.

System 100 also includes an anchoring mechanism 150 coupled to tubular assembly 116. Anchoring mechanism 150 is any device that enables tubular assembly 116 to be coupled to attachment point 108 within turbine engine 10 (both shown in FIG. 2). For example, anchoring mechanism 150 may couple tubular assembly 116 to attachment point 108 with a physical attachment, such as a clamp, or with a suction attachment. In the exemplary embodiment, anchoring mechanism 150 is an inflatable membrane 152 that selectively receives fluid, such as air, therein. Inflatable membrane 152 is deflated when tubular assembly 116 is retracted within guide tube 114, and is selectively inflatable when tubular assembly 116 is deployed from guide tube 114. When inflated, inflatable membrane 152 is sized to wedge itself between adjacent blades 112 (shown in FIG. 2), defining attachment point 108 to facilitate stabilizing tubular assembly 116 within confined space 106 (shown in FIG. 2).

In operation, first tubular body 128 and second tubular body 130 are rotatable to selectively orient tip end 146 in multiple degrees of freedom. For example, when deployed, first tubular body 128 is rotatable relative to a first rotational axis 154, and second tubular body 130 is rotatable relative to a second rotational axis 156. First rotational axis 154 and second rotational axis 156 are oriented obliquely or perpendicularly relative to each other. In addition, in one embodiment, second tubular body 130 is dependently rotatable with first tubular body 128, and is independently rotatable relative to first tubular body 128. As such, the orientation of tip end 146 is selected based on the rotation of first tubular body 128 and second tubular body 130.

Figure 4:
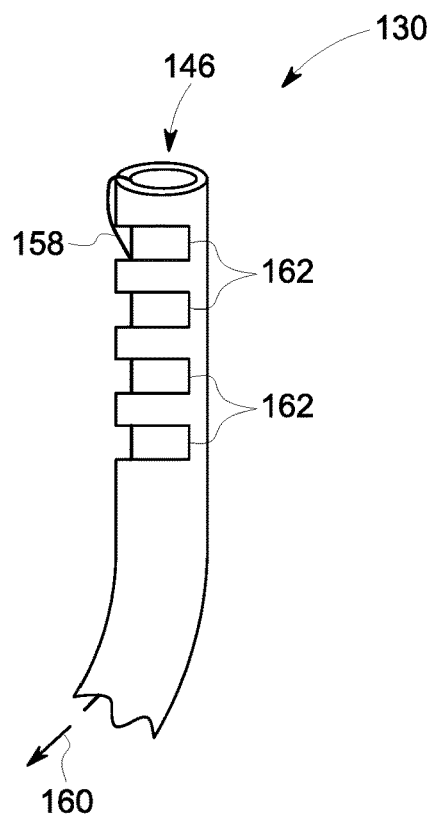
FIG. 4 is an enlarged view of a portion of the system shown in FIG. 2, the portion being in a first operational position.
Figure 5:
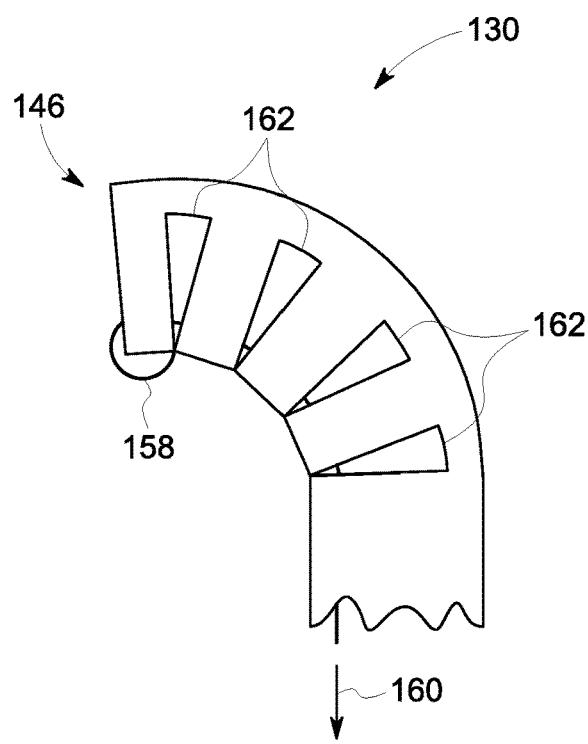
FIG. 5 is an enlarged view of the portion of the system shown in FIG. 4, the portion being in a second operational position.

FIG. 4 is an enlarged view of a portion of system 100 (shown in FIG. 2), the portion being in a first operational position, and FIG. 5 is an enlarged view of the portion being in a second operational position. In the exemplary embodiment, system 100 includes a steering cable 158 extending from tip end 146 of second tubular body 130. Steering cable 158 may be used to bias tip end 146 for selective orientation in additional degrees of freedom. For example, in operation, steering cable 158 is pullable in a pulling direction to provide a biasing force 160 to tip end 146. The biasing force facilitates further bending second tubular body 130 relative to the neutral shape (shown in FIG. 4). In some embodiments, system 100 may include more than one steering cable 158, connected at the same or different longitudinal locations of second tubular body 130, to bias tip end 146.

In the exemplary embodiment, second tubular body 130 includes a plurality of slots 162. The plurality of slots 162 are positioned in a location along second tubular body 130 that facilitates the selective orientation of tip end 146 in the additional degrees of freedom. Slots 162 facilitate decreasing the stiffness of select regions of second tubular body 130 to enable second tubular body 130 to be elastically bendable upon application of tensile biasing force 160 via steering cable 158. Thus, slots 162 are positioned proximate tip end 146 to facilitate selectively orientating tip end 146 by pulling steering cable 158 with varying force.

Figure 6:
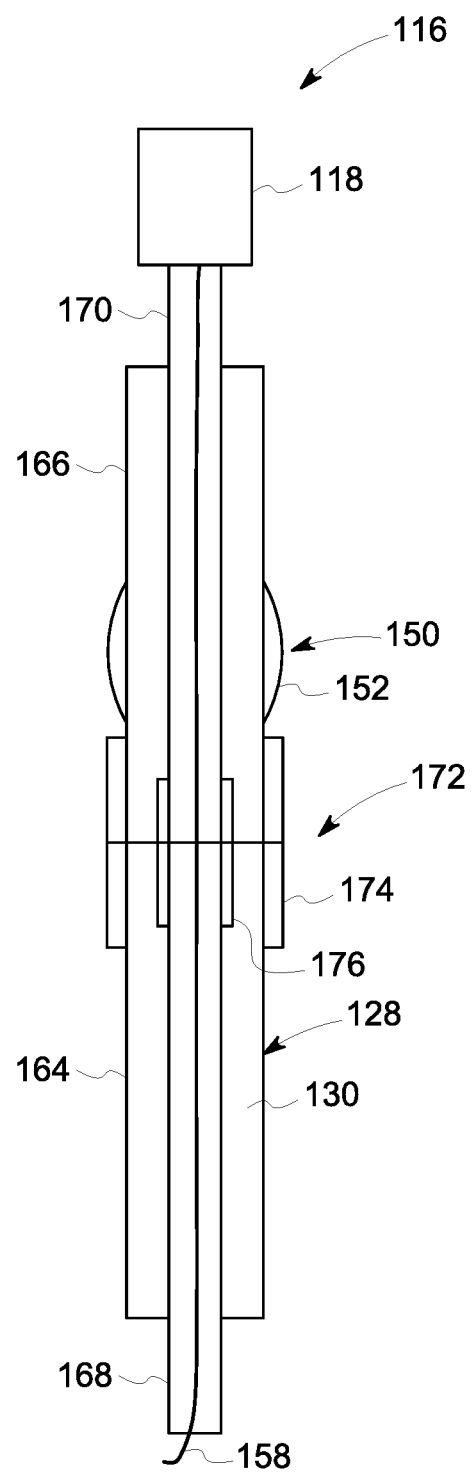
FIG. 6 is a schematic illustration of a portion of the system shown in FIG. 2, the portion being in a first operational mode.
Figure 7:
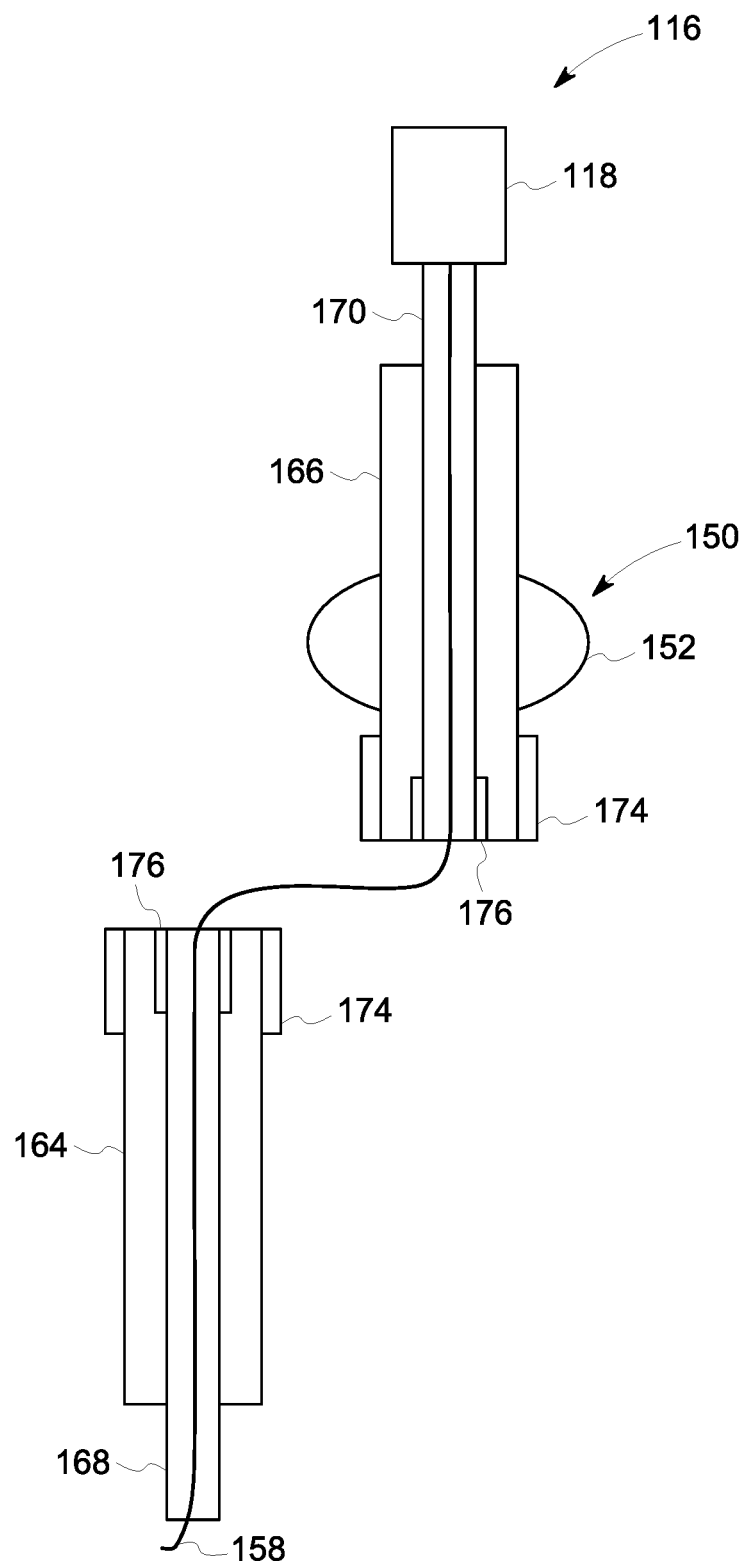
FIG. 7 is a schematic illustration of the portion of the system shown in FIG. 6, the portion being in a second operational mode.

FIG. 6 is a schematic illustration of a portion of system 100 (shown in FIG. 2), the portion being in a first operational mode, and FIG. 7 is a schematic illustration of the portion being in a second operational mode. In the exemplary embodiment, first tubular body 128 includes a first longitudinal section 164 and a second longitudinal section 166, and second tubular body 130 includes a first longitudinal section 168 and a second longitudinal section 170. First longitudinal sections 164 and 168 are selectively detachable from second longitudinal sections 166 and 170. For example, an attachment mechanism 172 is coupled between first longitudinal section 164 and second longitudinal section 166. Attachment mechanism 172 may be any mechanism that enables system 100 to function as described herein. For example, attachment mechanism 172 is capable of holding first longitudinal section 164 and second longitudinal section 166 together with a retaining force, releasing first longitudinal section 164 from second longitudinal section 166 when a force greater than the retaining force is applied, and then enabling re-attachment of first longitudinal section 164 and second longitudinal section 166 at a later time. Example attachment mechanisms 172 include, but are not limited to, a magnet and cables. In one embodiment, attachment mechanism 172 includes a first magnet pair 174 coupled between first longitudinal section 164 and second longitudinal section 166, and a second magnet pair 176 coupled between first longitudinal section 168 and second longitudinal section 170.

Figure 8:
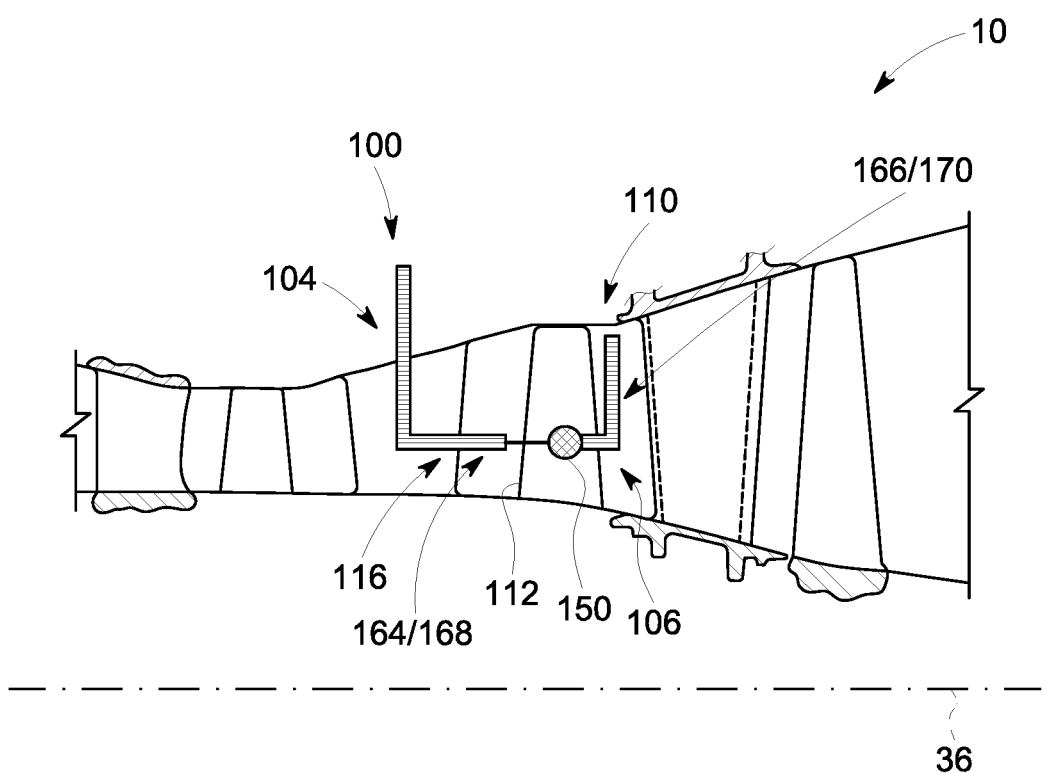
FIG. 8 is a schematic illustration of a portion of the turbomachine shown in FIG. 1 having the system shown in FIG. 3 positioned therein.

FIG. 8 is a schematic illustration of a portion of the turbine engine 10 having system 100 positioned therein. In the exemplary embodiment, turbine engine 10 is partially disassembled to provide access to confined space 106 within turbine engine 10. As described above, confined space 106 is at least partially defined by components of turbine engine 10, and may include maintenance location 110 in which an operation is to be performed. System 100 is positioned within confined space 106 to facilitate performing an operation at maintenance location 110. For example, system 100 is routed from access point 104 and through turbine engine 10 for positioning within confined space 106. Anchoring mechanism 150 is used to couple tubular assembly 116 to attachment point 108. The orientation of tubular assembly 116 may then be selectively modified, as described above, to facilitate positioning payload 118 (shown in FIG. 3) proximate maintenance location 110. Payload 118 may then perform an operation at maintenance location 110. For example, when payload 118 is a sensor, payload 118 may be used to detect potential damage to components at maintenance location 110.

In the exemplary embodiment, anchoring mechanism 150 facilitates coupling tubular assembly 116 to blades 112 of turbine engine 10, and tubular assembly 116 is oriented to extend in a substantially radial direction relative to centerline 36 to reach maintenance location 110. However, tubular assembly 116 is orientatable in any direction relative to centerline 36. In one embodiment, tubular assembly 116 is anchored on a rotor of turbine engine 10, and the rotor is turned to circumferentially position tubular assembly 116 proximate to maintenance location 110, positioned at a different circumferential location relative to centerline 36. In such an embodiment, second longitudinal sections 166 and 170 detach from first longitudinal sections 164 and 168, and travel with the rotating stage as it is rotated. Thus, system 100 may be used to deliver payload 118 and/or perform maintenance within turbine engine 10 without having to remove and then re-route system 100 through turbine engine 10.

An exemplary technical effect of the systems and methods described herein includes at least one of: (a) enabling in-situ delivery of a maintenance payload within a turbine engine; (b) increasing the accessibility of difficult-to-reach locations within a turbine assembly for inspection and/or in-situ repair; (c) reducing the time that turbine engines are out of service for maintenance; and (d) reducing unplanned service outages for a turbine engine.

Exemplary embodiments of methods and systems for use in delivering a maintenance payload within turbine engines are not limited to the specific embodiments described herein, but rather, components of systems and/or steps of the methods may be utilized independently and separately from other components and/or steps described herein. For example, the methods and systems may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a service apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in servicing a turbomachine, the system comprising:
    a first tubular body comprising an interior channel, wherein the first tubular body is bendable between a neutral shape or a biased shape, the first tubular body being bent when in the neutral shape;
    a second tubular body comprising a tip end, wherein the second tubular body is translatable within the interior channel, and is bendable between a neutral shape and a biased shape, the second tubular body being bent when in the neutral shape, wherein the first tubular body and the second tubular body are rotatable to selectively orient the tip end in multiple degrees of freedom; and
    a steering cable extending from the tip end, wherein the steering cable is configured to bias the tip end for selective orientation in additional degrees of freedom;
    wherein both the first and second tubular bodies are biased in the biased shape offset from the neutral shape when a biasing force is applied to at least one of the first tubular body and the second tubular body, and wherein both the first and second tubular bodies are bent when in the neutral shape when the biasing force is not applied.

2. The system in accordance with claim 1, wherein the second tubular body is dependently rotatable with the first tubular body, and is independently rotatable relative to the first tubular body.

3. The system in accordance with claim 1, wherein the second tubular body further comprises a plurality of slots defined therein, the plurality of slots positioned in a location along the second tubular body that facilitates the selective orientation of the tip end in the additional degrees of freedom.

4. The system in accordance with claim 1, wherein the first tubular body and the second tubular body each comprise a first longitudinal section and a second longitudinal section that are selectively detachable from each other.

5. The system in accordance with claim 1 further comprising an anchoring mechanism configured to couple the first tubular body to an attachment point within the turbomachine.

6. The system in accordance with claim 1 further comprising a camera coupled to the tip end of the second tubular body.

7. The system in accordance with claim 1, wherein at least one of the first tubular body and the second tubular body are fabricated from a superelastic material.

8. A system for use in servicing a turbomachine, the system comprising:
   a guide tube comprising an interior;
   a tubular assembly sized for insertion within, and deployable from, the interior of the guide tube, the tubular assembly comprising:
      a first tubular body comprising an interior channel, wherein the first tubular body is bendable between a neutral shape or a biased shape, the first tubular body being bent when in the neutral shape; and
      a second tubular body comprising a tip end, wherein the second tubular body is translatable within the interior channel, and is bendable between a neutral shape and a biased shape, the second tubular body being bent when in the neutral shape, wherein the first tubular body and the second tubular body are rotatable to selectively orient the tip end in multiple degrees of freedom;
      a steering cable extending from the tip end, wherein the steering cable is configured to bias the tip end for selective orientation in additional degrees of freedom; and
      a payload coupled to the tip end;
   wherein both first and second tubular bodies are bent in the neutral shape when there is no biasing force, and both first and second tubular bodies are straight in biased shape when biasing force is applied.

9. The system in accordance with claim 8, wherein the guide tube has a diameter of less than about 1 inch.

10. The system in accordance with claim 8, wherein the second tubular body is dependently rotatable with the first tubular body, and is independently rotatable relative to the first tubular body.

11. The system in accordance with claim 8, wherein the second tubular body further comprises a plurality of slots defined therein, the plurality of slots positioned in a location along the second tubular body that facilitates the selective orientation of the tip end in the additional degrees of freedom.

12. The system in accordance with claim 8, wherein the first tubular body and the second tubular body each comprise a first longitudinal section and a second longitudinal section that are selectively detachable from each other.

13. The system in accordance with claim 8 further comprising an anchoring mechanism configured to couple the first tubular body and the second tubular body to an attachment point within the turbomachine.

14. The system in accordance with claim 8, wherein at least one of the first tubular body and the second tubular body are fabricated from a superelastic material.

15. A method of servicing a turbomachine, the method comprising:
   providing access to a confined space within the turbomachine, wherein the confined space includes a maintenance location;
   positioning a tubular assembly within the confined space, the tubular assembly including:
      a first tubular body having an interior channel, wherein the first tubular body is bendable between a neutral shape or a biased shape, the first tubular body being bent when in the neutral shape; and
      a second tubular body having a tip end, wherein the second tubular body is translatable within the interior channel, and is bendable between a neutral shape and a biased shape, the second tubular body being bent when in the neutral shape, wherein the first tubular body and the second tubular body are rotatable to selectively orient the tip end in multiple degrees of freedom, and wherein a payload is coupled to the tip end, and wherein both first and second tubular bodies are bent in the neutral shape when there is no biasing force, and both first and second tubular bodies are straight in biased shape when biasing force is applied;
   rotating at least one of the first tubular body and the second tubular body to selectively orient the tip end in multiple degrees of freedom to position the payload proximate the maintenance location;
   biasing, with a steering cable extending from the tip end, the tip end for selective orientation in additional degrees of freedom to position the payload proximate the maintenance location; and
   performing a maintenance operation at the maintenance location with the payload.

16. The method in accordance with claim 15, wherein rotating at least one of the first tubular body and the second tubular body comprises:
   selectively rotating the first tubular body, wherein the second tubular body is dependently rotatable with the first tubular body; and
   selectively rotating the second tubular body independently of the first tubular body.

17. The method in accordance with claim 15, wherein the first tubular body and the second tubular body each comprise a first longitudinal section and a second longitudinal section that are selectively detachable from each other, the method further comprising:
   positioning the tubular assembly within a rotating stage of the turbomachine;
   anchoring the first longitudinal section to an attachment point within the rotating stage; and
   rotating the rotating stage such that the first longitudinal section detaches from the second longitudinal section.

18. The method in accordance with claim 15, wherein providing access to a confined space comprises disassembling the turbomachine.

19. The method in accordance with claim 15, wherein providing access to a confined space comprises defining an access point in an outer case of the turbomachine, the method further comprising routing the tubular assembly from the access point and through the turbomachine for positioning within the confined space.

20. The method in accordance with claim 19, wherein guiding the tubular assembly comprises:
   routing a guide tube from the access point towards the confined space, wherein the guide tube contains the tubular assembly therein; and
   deploying the tubular assembly from the guide tube into the confined space.

* * * * *